(12) United States Patent
Jeon et al.

(10) Patent No.: US 9,105,780 B2
(45) Date of Patent: Aug. 11, 2015

(54) METHOD OF FABRICATING GRAPHENE QUANTUM DOTS AND HIGH QUALITY GRAPHENE QUANTUM DOTS USING THE METHOD

(71) Applicant: KOREA ADVANCED INSTITUTE OF SCIENCE AND TECHNOLOGY, Daejeon (KR)

(72) Inventors: SeokWoo Jeon, Daejeon (KR); SungHo Song, Daejeon (KR); BoHyun Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 29 days.

(21) Appl. No.: 14/152,357

(22) Filed: Jan. 10, 2014

(65) Prior Publication Data

US 2015/0118143 A1   Apr. 30, 2015

(30) Foreign Application Priority Data

Oct. 24, 2013 (KR) .................. 10-2013-0127275

(51) Int. Cl.
| | | |
|---|---|---|
| C01B 31/04 | (2006.01) |
| H01L 33/04 | (2010.01) |
| H01L 33/00 | (2010.01) |
| H01L 33/34 | (2010.01) |
| B82Y 40/00 | (2011.01) |
| B82Y 20/00 | (2011.01) |

(52) U.S. Cl.
CPC ............ *H01L 33/04* (2013.01); *C01B 31/0484* (2013.01); *H01L 33/0054* (2013.01); *H01L 33/34* (2013.01); *B82Y 20/00* (2013.01); *B82Y 40/00* (2013.01); *Y10S 977/734* (2013.01); *Y10S 977/842* (2013.01)

(58) Field of Classification Search
CPC   C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/28; C01B 2204/30; C01B 2204/32
USPC ........... 423/448; 977/734, 742–754, 842–848
See application file for complete search history.

(56) References Cited

U.S. PATENT DOCUMENTS

2012/0321545 A1* 12/2012 Jeon et al. ..................... 423/448

FOREIGN PATENT DOCUMENTS

KR   10-2011-0106625 A   9/2011

OTHER PUBLICATIONS

Dengyu Pan et al., "Hydrothermal Route for Cutting Graphene Sheets into Blue-Luminescent Graphene Quantum Dots", Advanced Materials, 2010, pp. 734-738, vol. 22.

(Continued)

*Primary Examiner* — Daniel C McCracken
(74) *Attorney, Agent, or Firm* — Rabin & Berdo P.C.

(57) ABSTRACT

A simple and easy method for fabricating graphene quantum dots with uniformed size and high quality of emission property comprises steps of, mixing graphite powders with metallic hydrate salts, forming an intercalation compound of graphite wherein metal ions are inserted by heating the mixed solution, and removing the metal ions from the intercalation compound of graphite. The graphene quantum dots is applicable to the development of electronic products in next generation such as display devices, recording devices, various sensors and nanocomputers and is applicable to biological and medicinal field as well.

8 Claims, 10 Drawing Sheets

(56) References Cited

OTHER PUBLICATIONS

Ling-Ling Li et al., "A Facile Microwave Avenue to Electochemiluminescent Two-Color Graphene Quantum Dots", Advanced Functional Materials, 2012, pp. 2971-2979, vol. 22.

Sung Hwan Jin et al., "Tuning the Photoluminescene of Graphene Quantum Dots through the Charge Transfer Effect of Functional Groups", Acs Nano, 2013, pp. 1239-1245, vol. 7, No. 2.

* cited by examiner

METHOD OF FABRICATING GRAPHENE QUANTUM DOTS AND HIGH QUALITY GRAPHENE QUANTUM DOTS USING THE METHOD

BACKGROUND OF THE INVENTION

1. Field of the Invention

The present invention relates to a method of fabricating graphene quantum dots, and more particularly, relates to a method of fabricating graphene quantum dots of light-emitting properties using metallic hydrate salts, and also related to high quality graphene quantum dots fabricated by the method.

2. Description of the Related Art

Quantum dot is a crystal structure less than several tens of nanometers having light-emitting property. The quantum dot can emit light of various wavelengths by controlling the band gap energy of the quantum dot.

If the size of a material reduced to nanoscale, the energy level wherein electrons can exist is quantized. For example, the quantum confinement effect which does not appear in common materials appears in nanoparticles of several nanometers.

Since the band gap energy of a semiconductor nanoparticle relatively increases as the size of a semiconductor nanoparticle decreases, the semiconductor nanoparticle can emit dozens of colors only by controlling slightly the size of the semiconductor nanoparticle even the same material. Thus, the nanoparticles of semiconductor materials smaller than 10 nm or smaller than Debroglie wavelength have great potentials for applications such as electronic products for displays, recording devices, various sensors, nanocomputers, biological and medical applications, and so on.

The band gap between a conduction band and a valence band can be controlled using CdSe, CdTe, CdS, etc. which are commonly used for materials of quantum dots. The emitting wavelength can be controlled by controlling the size of quantum dots when an electron transit from higher level to lower level. Smaller quantum dot emits blue or purple light of short wavelength and larger quantum dot emits red light of long wavelength. Thus, the quantum dot can emit all colors of the light by controlling the size of it.

However, $Cd(2^+)$ precursors and $Se(2^-)$ precursors and capping with organic materials are necessary for fabricating the CdSe quantum dots. The fabrication method of CdSe quantum dots has environmental and economic problems because trioctylphosphine (TOP) for a reaction source is highly poisonous and expensive. The process instability of fabricating the CdSe quantum dots prevents the mass production because the reaction temperature is carried out at a high temperature above 300° C.

Graphene-based quantum dots can overcome the above mentioned problems and a display device using the graphene-based quantum dots can reduce leakage current by more than 20% compared with that of CdSe quantum dots which are commonly used for the display device.

A lithography method or a chemical synthesis method is used for fabricating quantum dots. The chemical synthesis method needs relatively more simple apparatus than the lithography method for fabricating quantum dots.

The resolution of lithography strongly depends on a lithography apparatus. A quantum dot of several to several tens of nanometers can be fabricated using an extra ultraviolet (EUV) lithography apparatus, an e-beam apparatus, or an x-ray apparatus, but the production cost is high. It is also difficult to produce quantum dots with uniformed shape and size on the whole substrate using a common lithography apparatus.

The method for fabricating quantum dots using a deposition method such as physical vapor deposition or chemical vapor dispersion also has limitation in producing and controlling quantum dots with uniformed distribution and size.

Chemical reduction method is synthesizing graphene with flakes of graphene oxide exfoliated from graphite. Forming the graphene solution enables low temperature firing and mass synthesis. The dispersion stability of the graphene is excellent, but the graphene has high sheet resistance.

In order to apply quantum dots of graphene to a display apparatus, high quality graphene with a single layer is necessary. Therefore, a fabrication method of controlling the size of the graphene quantum dot is required for natural colors.

Korean published patent No. 10-2011-0106625 discloses a method of fabricating 2-dimensional nanostructured graphene by forming intercalation compound of graphite after inserting alkali metal ions or alkaline earth metal ions between layers of the graphite.

In addition, as conventional methods of oxidation/reduction process, a heat treatment method in a autoclave after oxidation process of the graphene with sulfuric acid or nitric acid (Dengyu Pan et al., "Hydrothermal Route for Cutting Graphene Sheets into Blue-Luminescent Graphene Quantum Dots", Adv. Mater. 2010, 22, 734-738), a microwave treatment method (Ling-Ling Li et al., "A Facile Microwave Avenue to Electrochemiluminescent Two-Color Graphene Quantum Dots", Adv. Funct. Mater. 2971-2979, 22, 2012), a hydrazine ($N_2H_4$) liquid treatment method (Sung Hwan Jin et al., "Tuning the Photoluminescence of Graphene Quantum Dots through the Charge Transfer Effect of Functional Groups", Acs. Nano. 1239-1245, 7, 2013) were reported.

However, the conventional method for fabricating the graphene quantum dots requires severely oxidation/reduction processes of the graphite. Complicate reaction process, expensive fabrication costs and low yield are yet remained as problems to be solved.

SUMMARY OF THE INVENTION

In order to solve the above technical problems, the present invention provides a method for fabricating high quality graphene quantum dots, comprising the steps of: mixing graphite powders with metallic hydrate salts; forming an intercalation compound of graphite wherein metal ions are inserted by heating the mixed solution; and removing the metal ions from the intercalation compound of graphite.

In a preferred embodiment of the present invention, wherein the metallic hydrate salts include at least one metal selected from the group consisting of Li, Na, K, Ca and Mg.

In a preferred embodiment of the present invention, wherein the metal ions of the intercalation compound of graphite is removed by dissolving the intercalated compound in the solvent of one or the mixture selected from the group consisting of alcohol, ketone, ether, water, amide.

In a preferred embodiment of the present invention, wherein the metallic hydrate salt is at least one or the compound selected from the group consisting of sodium acetate trihydrate ($NaC_2H_3O_2.3H_2O$), sodium carbonate heptahydrate ($Na_2CO_3.7H_2O$), sodium citrate pentahydrate ($Na_3C_6H_5O_7.5H_2O$), sodium orthophosphate dodecahydrate ($Na_3PO_4.12H_2O$), sodium sulfate heptahydrate ($Na_2SO_4.7H_2O$), sodium sulfate decahydrate ($Na_2SO_4.10H_2O$), potassium and magnesium sulfate hexahydrate ($K_2SO_4MgCl_2.6H_2O$), calcium acetate hexahydrate (Ca ($C_2H_3O_2)_2.6H_2O$), calcium carbonate hexahydrate ($CaCO_3.6H_2O$), calcium chloride hexahydrate ($CaCl_2.6H_2O$), calcium citrate tetrahydrate ($Ca_3[O_2CCH_2C(OH)(CO_2)CH_2CO_2]_2.4H_2O$), calcium lactate pentahydrate ($Ca(C_5H_3O_3)_2.5H_2O$), calcium nitrate trihydrate ($Ca(NO_3)_2.3H_2O$), calcium sulfate dehydrate ($CaSO_4.2H_2O$), magnesium acetate tetrahydrate ($Mg(C_2H_3O_2)_2.4H_2O$), magnesium carbonate pentahydrate ($MgCO_3.5H_2O$), magnesium acetate trihydrate ($Mg(C_2H_3O_2)_2.3H_2O$), magnesium nitrate hexahydrate ($Mg(NO_3)_2.6H_2O$), magnesium orthophosphate octahydrate ($Mg(PO_4)_2.8H_2O$), magnesium sulfate heptahydrate ($MgSO_4.7H_2O$), magnesium tartrate pentahydrate ($MgC_4H_4O_6.5H_2O$) and sodium carbonate decahydrate ($Na_2CO_3.10H_2O$).

In a preferred embodiment of the present invention, wherein the heating the mixed solution carried out at the temperature range of 70~400° C.

The present invention further comprises a step of re-dispersing the graphene quantum dots into a solvent for adjusting the size of the graphene quantum dots and controlling the band gap of the graphene quantum dot, wherein the solvent is at least one selected from the group consisting of water, ethanol, methanol, isopropanol, formic amide, dimethyl sulfide, dimethyl formic amide, acetic acid, acetonitrile, methoxyethanol, tetrahydrofuran, benzene, xylene, toluene, and cyclohexane.

According to one aspect of the invention, the present invention further comprises a step of mixing the graphite powders with at least one 2 dimensional material selected from the group consisting of $MoS_2$, $WS_2$, $MoSe_2$, $MoTe_2$, $TaSe_2$, $NbSe_2$, $NiTe_2$, BN, and $Bi_2Te_3$.

In addition, the present invention provides the graphene quantum dots which are applicable to material for semiconductor and display in accordance with the above method.

BRIEF DESCRIPTION OF THE DRAWINGS

FIG. 4A-a shows the surface height image, FIG. 4A-b shows the height profile of the part b in the FIG. 4A-a, FIG. 4A-c shows the height profile of the part c in the FIG. 4A-a, and FIG. 4A-d shows the height profile of the part d in the FIG. 4A-a.

FIG. 4B-a shows the surface height image of the A grade graphene quantum dots, FIG. 4B-b shows the height profile of the line part in the FIG. 4B-a, FIG. 4B-c shows the surface height image of the A grade graphene quantum dots, and FIG. 4B-d shows the height profile of the line part in the FIG. 4B-c.

DETAILED DESCRIPTION OF THE PREFERRED EMBODIMENTS

Figure 1:
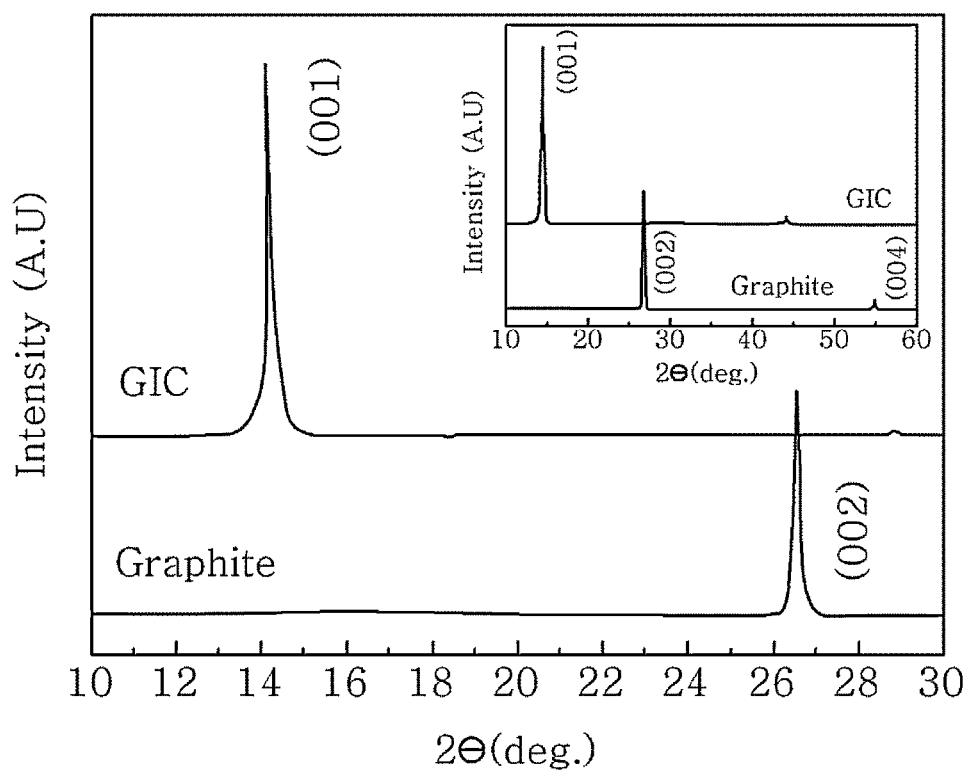
FIG. 1 shows a measurement result of x-ray diffractometer (XRD) of the intercalation compound of graphite in accordance with an embodiment of the present invention.

The present invention provides a method for fabricating high quality graphene quantum dots, comprising the steps of: mixing graphite powders with metallic hydrate salts; forming an intercalation compound of graphite wherein metal ions are inserted by heating the mixed solution; and removing the metal ions from the intercalation compound of graphite.

The metallic salt which comprises a metal ion and a corresponding anion may be an alkaline metallic salt or an alkaline earth metallic salt wherein the metal ion is intercalated between layers of graphite. The metallic salt may be at least one selected from the group consisting of organic carboxylic acid salt, alkoxy salt, oxalate salt, phenoxy salt, hydrochloric salt, organic sulfonic acid salt, organic phosphate salt, sulfonic acid salt, phosphate salt, carbonate salt, halogen salt, and nitrate salt of an alkali metal or alkaline earth metal.

In the case of the organic carboxylic acid salt, alkoxy salt, phenoxy salt, organic sulfonic acid salt, and organic phosphate salt of an alkali metal or alkaline earth metal, each of them may comprise at least one functional group selected form the group consisting of a chain of aliphatic hydrocarbons, a ring of aromatic hydrocarbons and aromatic heterocyclic group.

The chain of aliphatic hydrocarbons is an alkyl group which has 1 to 30 carbons and the ring of aromatic hydrocarbons is an aryl group which has 6 to 40 carbons and the aromatic heterocyclic group is a heteroaryl group which has 2 to 40 carbons.

As an example of the invention, if lithium is used as a metal and the corresponding anion is an organic carboxylic acidic anion, the organic carboxylic acid may comprise at least one functional group selected from the group of consisting of the alkyl group which has 1 to 30 carbons, the aryl group which has 6 to 40 carbons and the heteroaryl group which has 2 to 40 carbons.

As a further example of the invention, if calcium is used as a metal and the corresponding anion is an alkoxy group, the alkoxy group may comprise at least one functional group selected from the group of consisting of the alkyl group which has 1 to 30 carbons, the aryl group which has 6 to 40 carbons and the heteroaryl group which has 2 to 40 carbons.

The aryl group used in the present invention is organic radical derived from the aromatic hydrocarbon by removing one hydrogen atom. It includes single ring system or fused ring system which comprises 5 to 7 members, preferably 5 or 6 members. In addition, in the case of substituent exists in the aryl group, the substituent can be fused with neighbor substituent so that form an additional ring, and one hydrogen atom of the aryl group can be substituted by a deuterium atom, a halogen atom, a hydroxy group, a nitro group, a cyano group, a silyl group, an amino group, a carboxyl group, a sulfonic acid group, a phosphoric acid group, an alkyl group which has 1 to 24 carbons, a halogenated alkyl group which has 1 to 24 carbons, an alkenyl group which has 1 to 24 carbons, a alkynyl group which has 1 to 24 carbons, a heteroarkyl group which has 1 to 24 carbons, an aryl gorup which has 6 to 24 carbons, an aryl-alkyl gorup which has 6 to 24 carbons, a heteroaryl gruop which has 2 to 24 carbons or heteroaryl-alkyl group which has 2 to 24 carbons.

As specific examples of the aryl, there are phenyl, naphthyl, biphenyl, terphenyl, anthryl, indenyl, fluorenyl, phenanthryl, triphenylenyl, pyrenyl, perylenyl, chrysenyl, naphthacenyl and fluoranthenyl. In addition, the alkyl group is an organic radical derived from the aliphatic hydrocarbon by removing one hydrogen atom. It includes linear or branched structures and also includes the cyclic alkyl group.

In addition, at least one hydrogen atom of the alkyl group is substitutable by the same substituent as the aryl group.

As specific examples of the alkyl, there are methyl, ethyl, propyl, isopropyl, n-butyl, isobutyl, pentyl, isopentyl, cyclopentyl, cyclohexyl, t-butyl.

The heteroaryl group means hetero aromatic organic radical with 2 to 24 carbons comprising 1 to 4 hetero atoms selected among N, O, P, or S in each rings in the aryl group. The rings form a ring by fusion, and at least one hydrogen atom of the heteroaryl group is substitutable by the same substituent as the case of aryl group.

In the present invention, one metal or the mixture selected from lithium, natrium, potassium, rubidium and cesium can be used as the alkaline metal, and one metal or the mixture selected from beryllium, magnesium, calcium, strontium, barium can be used as the alkaline earth metal.

The alkaline metal or the alkaline earth metal in the present invention may be at least one metal selected from Li, Na, K, Ca and Mg.

In the present invention, the metallic hydrate salt instead of the conventional metal salt itself has economical advantage and provides stability. In case of using only the metal salt, the process temperature should be higher than the eutectic temperature in order to acquire the metal ion, and the eutectic temperature should be controlled so that the temperature is not excessively high. Thus, there is a limitation in selecting the metal salt due to the eutectic temperature.

However, in the present invention, using the metallic hydrate salts instead of the metallic anhydride salt which is metal salt itself makes it easy to acquire the metal ion at low temperature and enables the intercalation between layers of the expanded graphite.

In the present invention, the metallic hydrate salt is at least one or the compound selected from the group consisting of sodium acetate trihydrate ($NaC_2H_3O_2.3H_2O$), sodium carbonate heptahydrate ($Na_2CO_3.7H_2O$), sodium citrate pentahydrate ($Na_3C_6H_5O_7.5H_2O$), sodium orthophosphate dodecahydrate ($Na_3PO_4.12H_2O$), sodium sulfate heptahydrate ($Na_2SO_4.7H_2O$), sodium sulfate decahydrate ($Na_2SO_4.10H_2O$), potassium and magnesium sulfate hexahydrate ($K_2SO_4MgCl_2.6H_2O$), calcium acetate hexahydrate ($Ca(C_2H_3O_2)_2.6H_2O$), calcium carbonate hexahydrate ($CaCO_3.6H_2O$), calcium chloride hexahydrate ($CaCl_2.6H_2O$), calcium citrate tetrahydrate ($Ca_3[O_2CCH_2(OH)(CO_2)CH_2CO_2]_2.4H_2O$), calcium lactate pentahydrate ($Ca(C_5H_3O_3)_2.5H_2O$), calcium nitrate trihydrate ($Ca(NO_3)_2.3H_2O$), calcium sulfate dehydrate ($CaSO_4.2H_2O$), magnesium acetate tetrahydrate ($Mg(C_2H_3O_2)_2.4H_2O$), magnesium carbonate pentahydrate ($MgCO_3.5H_2O$), magnesium acetate trihydrate ($Mg(C_2H_3O_2)_2.3H_2O$), magnesium nitrate hexahydrate ($Mg(NO_3)_2.6H_2O$), magnesium orthophosphate octahydrate ($Mg(PO_4)_2.8H_2O$), magnesium sulfate heptahydrate ($MgSO_4.7H_2O$), magnesium tartrate pentahydrate ($MgC_4H_4O_6.5H_2O$) and sodium carbonate decahydrate ($Na_2CO_3.10H_2O$).

The method of fabrication the graphene comprises of following steps: a) fabricating the intercalation compound of the graphite wherein metal ions are intercalated by heating after mixing the graphite with alkaline metallic hydrate salts or alkaline earth metallic hydrate salts; b) fabricating high quality graphene quantum dots by removing the metal ion from the intercalation compound of the graphite.

As the first step, graphite powders is mixed with metallic hydrate salts, and then the mixture is uniformly melted by heating, and thereby an intercalation compound of graphite is formed wherein metal ions are inserted between layers of the graphite. The heating temperature is 100 to 400° C., more preferably 150 to 300° C. In the case of lower temperature than the above range, the graphite and metallic hydrate salt may not be melted so uniform that the intercalation compound cannot be formed. In the case of higher temperature than the above range, thermal cracking of the reactants occurs or a lot of byproducts is generated so that the mass production is difficult.

The weight ratio of the graphite and the metallic hydrate salt is in the range of 1:1 to 10, more preferably 1:1 to 5. If the content of the graphite is higher than the above range, the graphite intercalation compound cannot be formed. In the case of the high content of metallic hydrate salt, the fabrication cost of the graphene quantum dots increases in order to remove the increased salt.

The alkaline metal anhydrate salt or the alkaline earth metal anhydrate salt is additionally addible to the alkaline metallic hydrate salt or the alkaline earth metallic hydrate salt and can be mixed with the graphite.

In the present invention, the second step for fabricating high quality graphene quantum dots is removing the metal ion from intercalation compound of the graphite. The intercalated metal ion can be removed by dispersing the intercalation compound into the solvent which dissolves the metal ion.

Removing the metal ion from the intercalation compound of the graphite is carried out by dispersing the intercalation compound in the solvent comprising alcohol, acetone, water or the mixture of them.

The solvent is one selected from the group of consisting of water, ethanol, methanol, isopropanol, formic amide, dimethyl sulfoxide, dimethyl formic amide, acetic acid, acetonitrile, methoxy ethanol, tetra hydro furan, benzene, xylene, toluene and cyclohexane.

When the intercalation compound of the graphite is dispersed into alcohol or aqueous solution or mixture of them having the hydroxyl group, the metal ions are dissolved and removed from the intercalation compound of the graphite. At the same time, the intercalation compound of the graphite flakes off into several layers and the graphene quantum dots are formed. At this time, ultrasound process is additionally added to enhance solubility of the quantum dots and the metal ions, whereby the graphene quantum dots can be fabricated more effectively.

The present invention further comprises a step of mixing the graphite with at least one 2 dimensional material selected from the group consisting of $MoS_2$, $WS_2$, $MoSe_2$, $MoTe_2$, $TaSe_2$, $NbSe_2$, $NiTe_2$, BN, and $Bi_2Te_3$ or the mixture of 2 dimensional material selected from the group consisting of $MoS_2$, $WS_2$, $MoSe_2$, $MoTe_2$, $TaSe_2$, $NbSe_2$, $NiTe_2$, BN, and $Bi_2Te_3$.

The step of re-dispersing the graphene quantum dots into a solvent is additionally addible after the step of removing the metal ions from intercalation compound of graphite.

The step of re-dispersing the graphene quantum dots into the solvent can control the band gap between the conduction band and valence band by adjusting the size of the graphene quantum dot by selecting proper dispersion solvent. In this case, the solvent for re-dispersion can be at least one selected from the group consisting of water, ethanol, methanol, isopropanol, formic amide, dimethyl sulfoxide, dimethyl formic amide, acetic acid, acetonitrile, methoxy ethanol, tetra hydro furan, benzene, xylene, toluene and cyclohexane.

In addition, the present invention provides the graphene quantum dots which are applicable to materials of display and semiconductor in accordance with the fabrication method.

Embodiment 1

1.1 Forming the Graphene Intercalation Compound

The intercalation compound of graphite has been formed by mixing the sodium potassium tartrate 4 hydrate of 0.1 g with the natural graphite powder of 0.1 g, and by heating the mixture at 300° C. While the natural graphite powder was being transformed into the expended intercalation compound of the graphite, the change of the color was observed from black to yellowish brown.

1.2 Fabricating the Graphene Quantum Dots

The intercalation compound of graphite of 1 g has been dispersed in water of 25 ml and it flaked off. Dialysis has been carried out for removing metal ions.

The fabricated graphene quantum dots have been classified by a membrane filter into A grade of the size of ~5 nm, B grade of 5~10 nm, C grade of 10~20 nm, and D grade of >20 nm.

FIG. 1 shows a result of x-ray diffractometer (XRD) of the intercalation compound of graphite in accordance with the embodiment 1. As shown in the FIG. 1, 2.89 Å expansion of the intercalation compound of graphite due to potassium ions and various carbon chains are observed.

Comparison 1

The graphene quantum dots which are fabricated by the oxidation/reduction method to compare with the present invention.

The 1 g natural graphite powder and 3.5 g $KMnO_4$ have been put into 40 ml sulfuric acid in an ice bath. After increasing the temperature to 35° C., the reaction was being proceeded for 2 hours. The mixed solution of 200 ml water and 510 ml hydrogen peroxide was added and proceeded until bubbles are observed. After reaction, the solution was filtrated using a glass filter and washed with 10% hydrochloric acid aqueous solution and the filtered solids was dried.

Figure 2A:
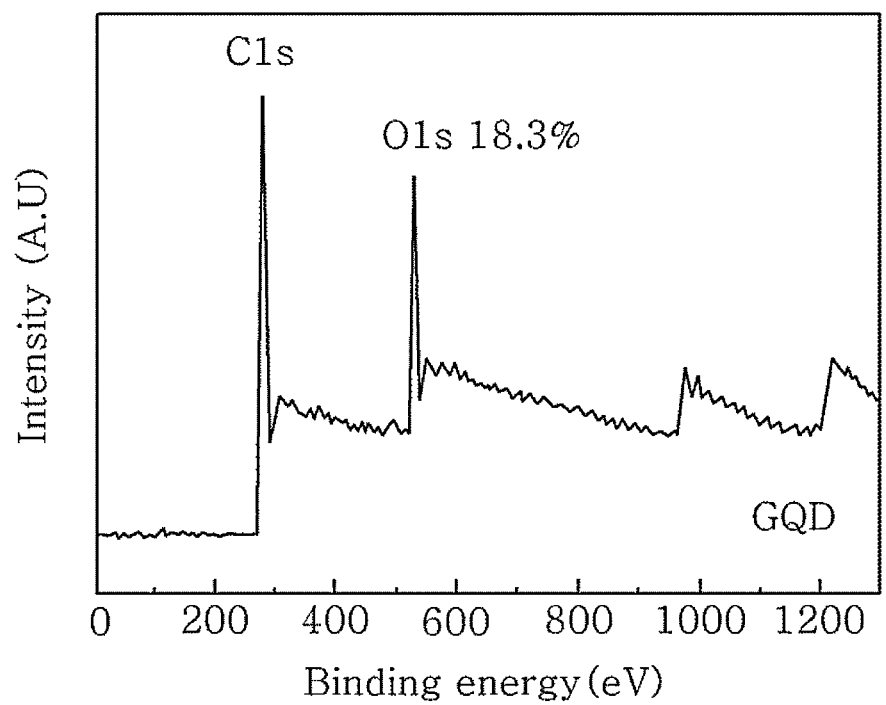
FIG. 2A is the survey data of x-ray photoelectron spectroscopy showing the presence of carbon and oxygen due to the sodium potassium.
Figure 2B:
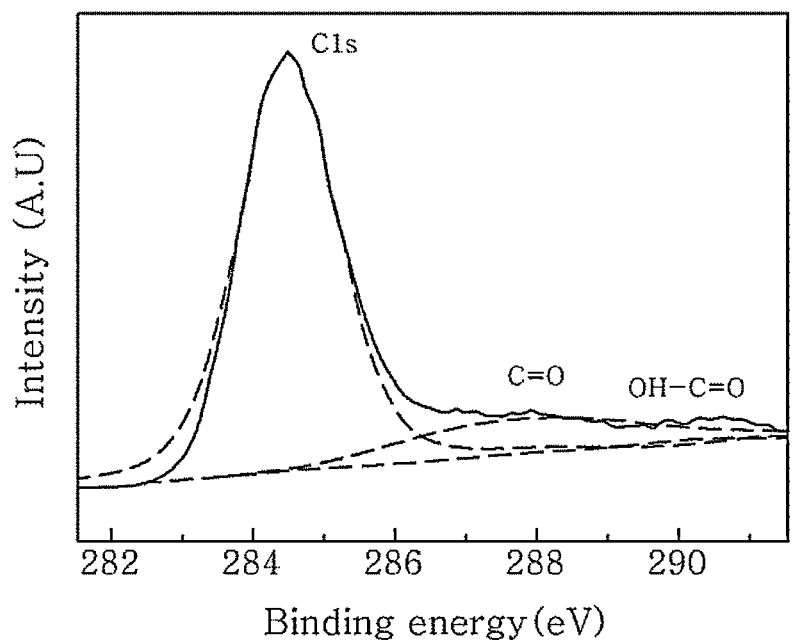
FIG. 2B magnifies the carbon peak and FIG. 2C magnifies the oxygen peak.
Figure 2C:
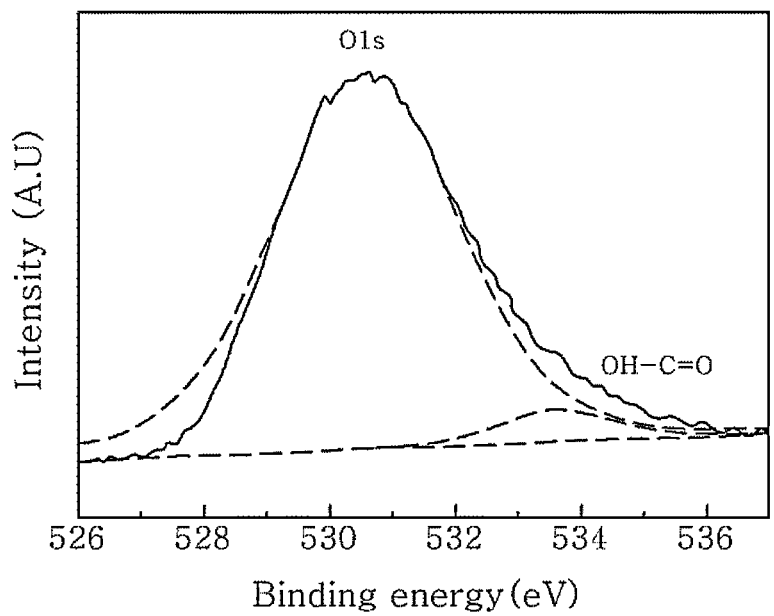

FIGS. 2A and 2B show a result of x-ray photoelectron spectroscopy (XPS) of the graphene quantum dots. FIG. 2A is the survey data of x-ray photoelectron spectroscopy showing the presence of carbon and oxygen due to the sodium potassium. FIG. 2B magnifies the carbon peak and FIG. 2C magnifies the oxygen peak.

The result of the XPS shows that the surface of the graphene quantum dots fabricated by the embodiment 1 was transformed to the function group by the sodium potassium tartrate. FIG. 2A is the survey data showing the presence of carbon and oxygen due to the sodium potassium. Referring to the carbon and oxygen peaks of FIG. 2B and FIG. 2C, the transformed function group by the carboxylic acid is observed and the epoxy group due to surface damage is not observed.

Figure 3:
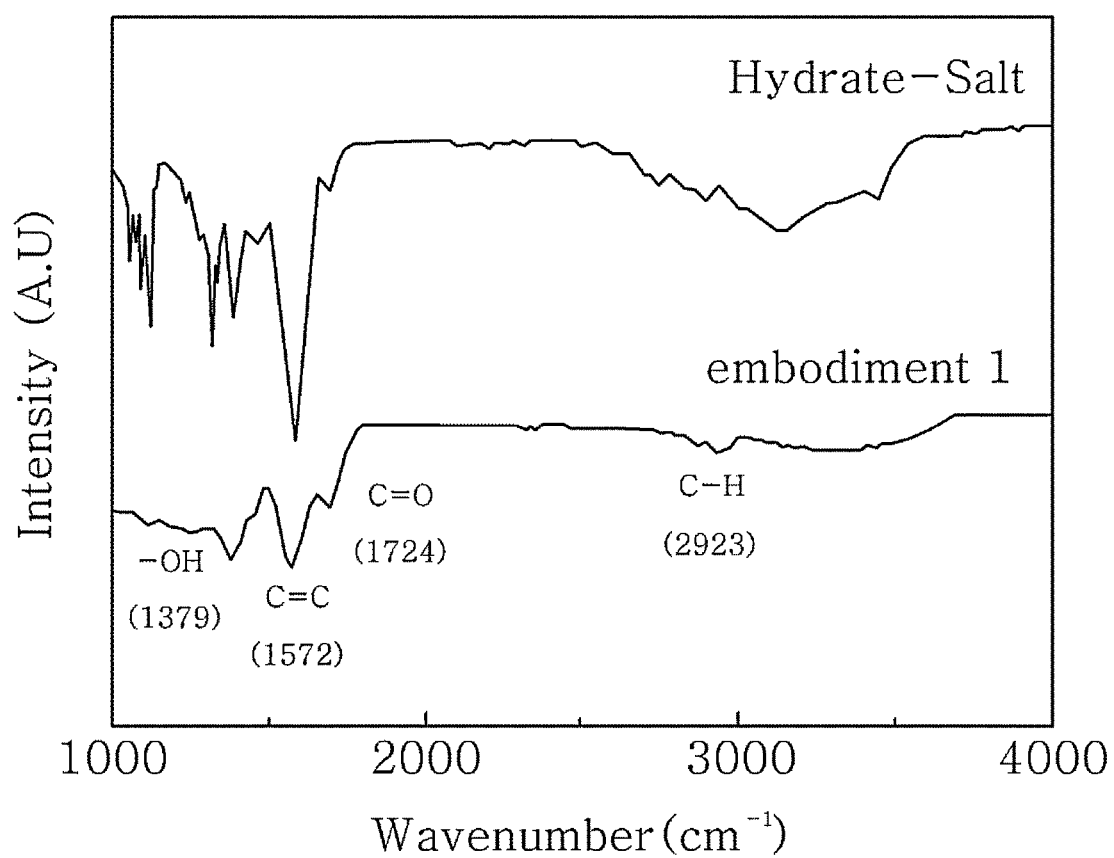
FIG. 3 shows a measurement result of FT-IR spectroscopy of graphene quantum dots in accordance with an embodiment of the present invention.

FIG. 3 shows a result of FT-IR spectroscopy of the graphene quantum dots fabricated by the embodiment 1. The result of the FT-IR shows that the mono-layered graphene quantum dots has been changed into the function group by the metallic hydrate salt through the presence of the peak which is the same as the metallic hydrate slat, and the epoxy group due to surface damage is not observed.

Figure 4A:
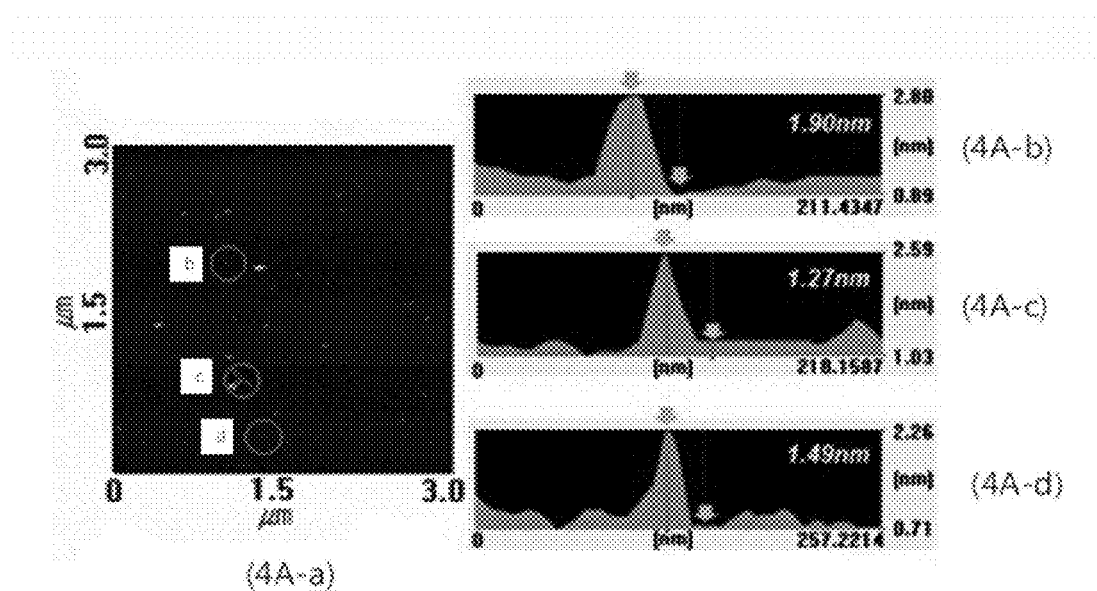
FIG. 4A shows a result of AFM of the A grade grapheme quantum dots by the embodiment 1.

FIG. 4A shows a result of AFM of the A grade graphene quantum dots by the embodiment 1. FIG. 4A-a shows the surface height image, FIG. 4A-b shows the height profile of the part b in the FIG. 4A-a, FIG. 4A-c shows the height profile of the part c in the FIG. 4A-a, and FIG. 4A-d shows the height profile of the part d in the FIG. 4A-a.

Figure 4B:
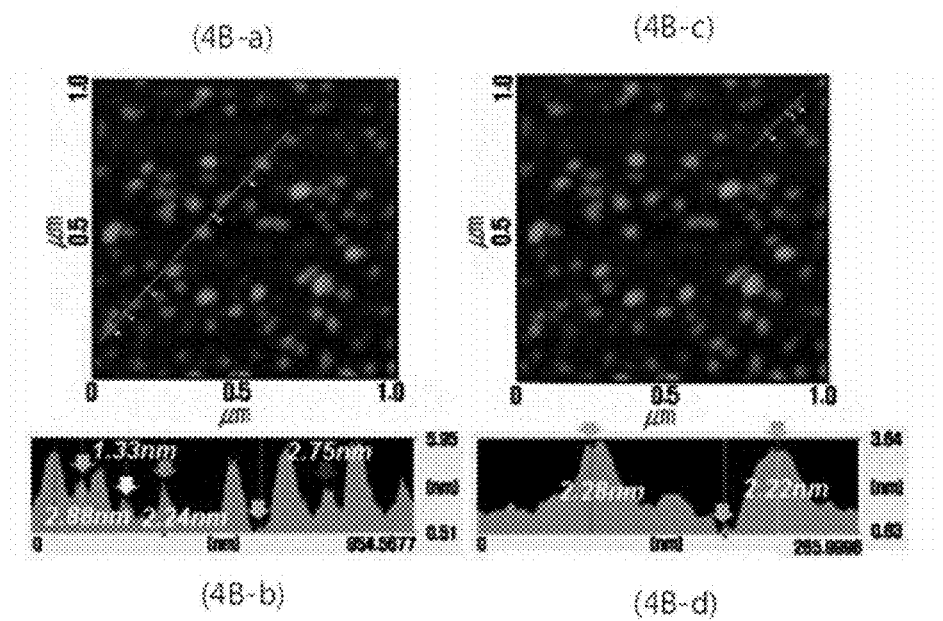

FIG. 4B-a shows the surface height image of the A grade quantum dots, FIG. 4B-b shows the height profile of the line part in the FIG. 4B-a, FIG. 4B-c shows the surface height image of the A grade graphene quantum dots, and FIG. 4B-d shows the height profile of the line part in the FIG. 4B-c. The results of the AFM show that mono-layered or multiple layered graphene quantum dots are fabricated.

Figure 5A:
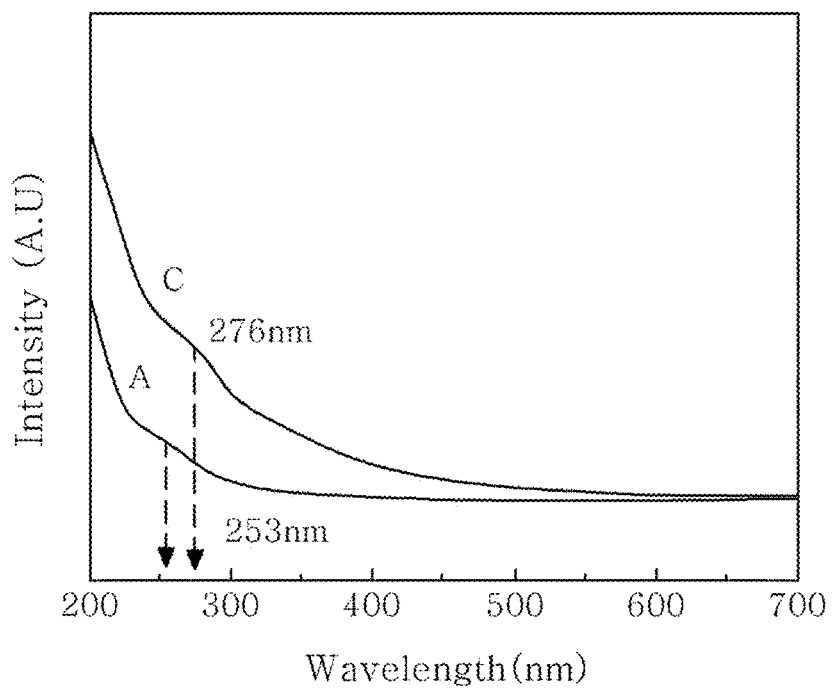
FIG. 5A shows a result of Uv-Vis spectroscopy of the A and C grade graphene quantum dots fabricated by the embodiment 1 and FIG. 5B shows a luminescence image of the Uv-Vis spectroscopy of the A and B grade graphene quantum dots fabricated by the embodiment 1.
Figure 5B:
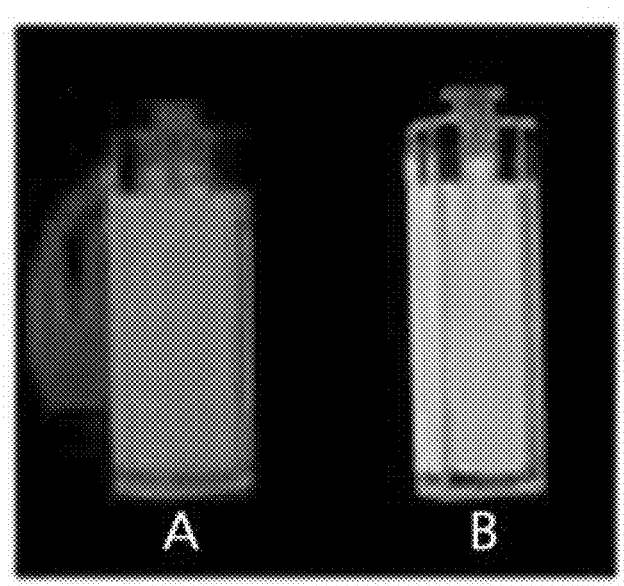

FIG. 5A shows a result of Uv-Vis spectroscopy of the A and C grade graphene quantum dots fabricated by the embodiment 1 and FIG. 5B shows a luminescent image of the Uv-Vis spectroscopy of the A and B grade graphene quantum dots fabricated by the embodiment 1. In FIG. 5A, the peaks of 253 nm and 276 nm are observed and the peak of 300 nm due to the graphene defects is not observed. These results mean that the high quality graphene quantum dots were fabricated.

Figure 6:
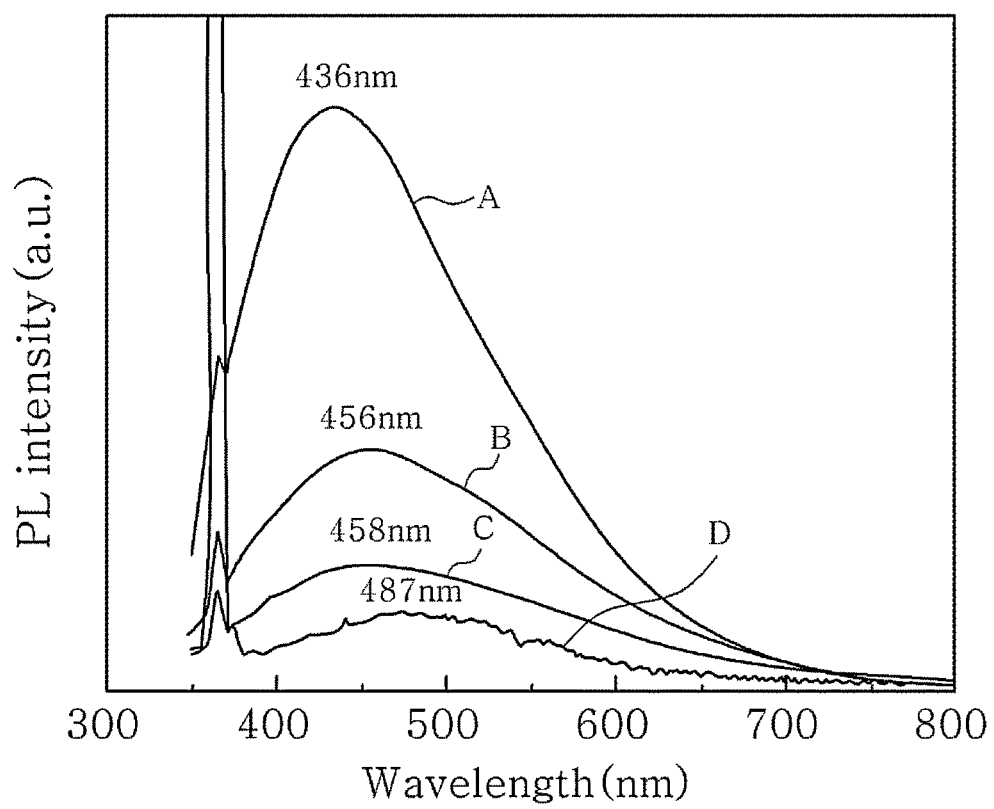
FIG. 6 shows measurement results of emission spectrum of graphene quantum dots in accordance with an embodiment of the present invention.

FIG. 6 shows a result of emission spectrum of the A to D grade graphene quantum dots having different sizes fabricated by the embodiment 1. The emission peaks are observed in 436 nm, 456 nm, 458 nm, 487 nm, respectively in accordance with the sizes of the A to D grade graphene quantum dots.

Figure 7:
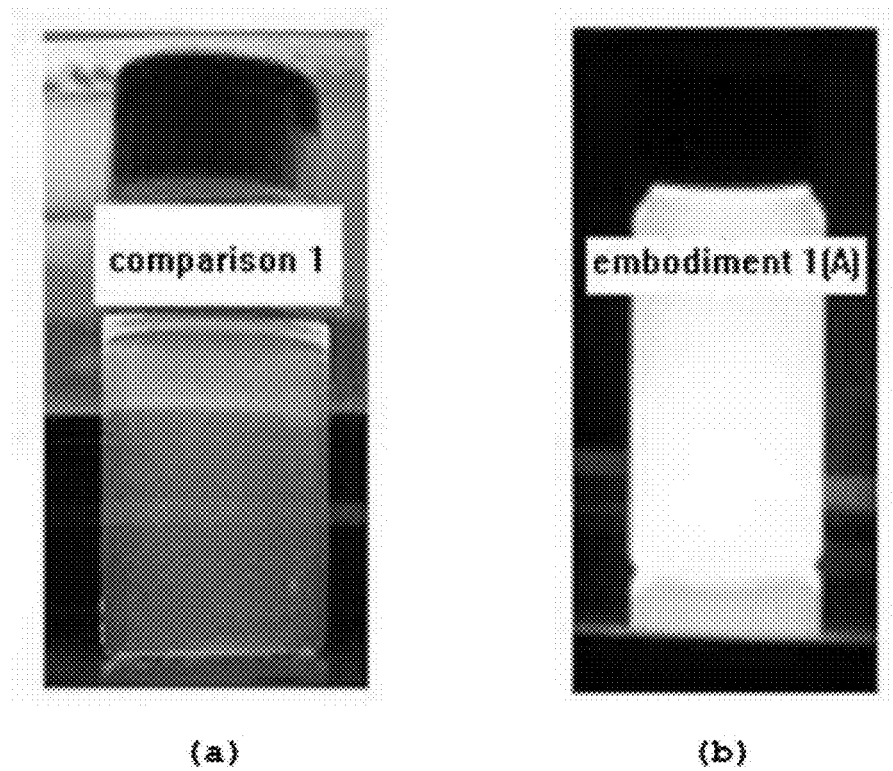
FIG. 7($a$) shows a luminescence photo of graphene quantum dots fabricated by the present invention and FIG. 7($b$) shows a luminescence photo of graphene quantum dots fabricated by a conventional oxidation/reduction method.

FIG. 7 shows a luminescence photo of the graphene quantum dots fabricated by the comparison 1 by the oxidation/reduction method and a luminescence photo of the A grade graphene quantum dots fabricated by the embodiment 1. The photos show that the emission property of the graphene quantum dots fabricated by the present invention is better than that of the conventional oxidation/reduction method.

Figure 8:
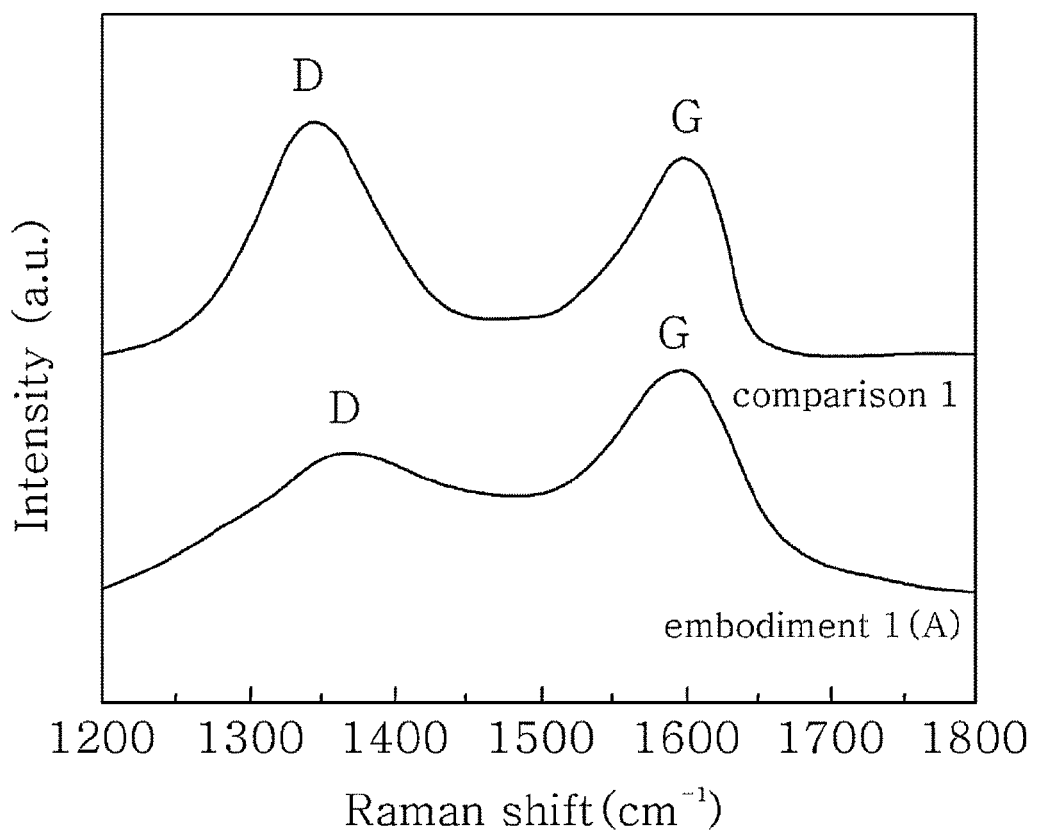
FIG. 8 shows measurement results of the graphene quantum dots fabricated by an embodiment of the present invention and the graphene quantum dots fabricated by the conventional oxidation/reduction method.

FIG. 8 shows the Raman analysis of the A grade graphene quantum dots fabricated by the embodiment 1 and the graphene quantum dots fabricated by the comparison 1, The results shows that the damage of the A grade graphene quantum dots by the embodiment 1 is relatively less than that of the graphene quantum dots by the comparison 1. In other words, the low intensity of the D band which means defects in the graphene quantum dots implies that the A grade_graphene quantum dot in the embodiment 1 was relatively less damaged.

Figure 9:
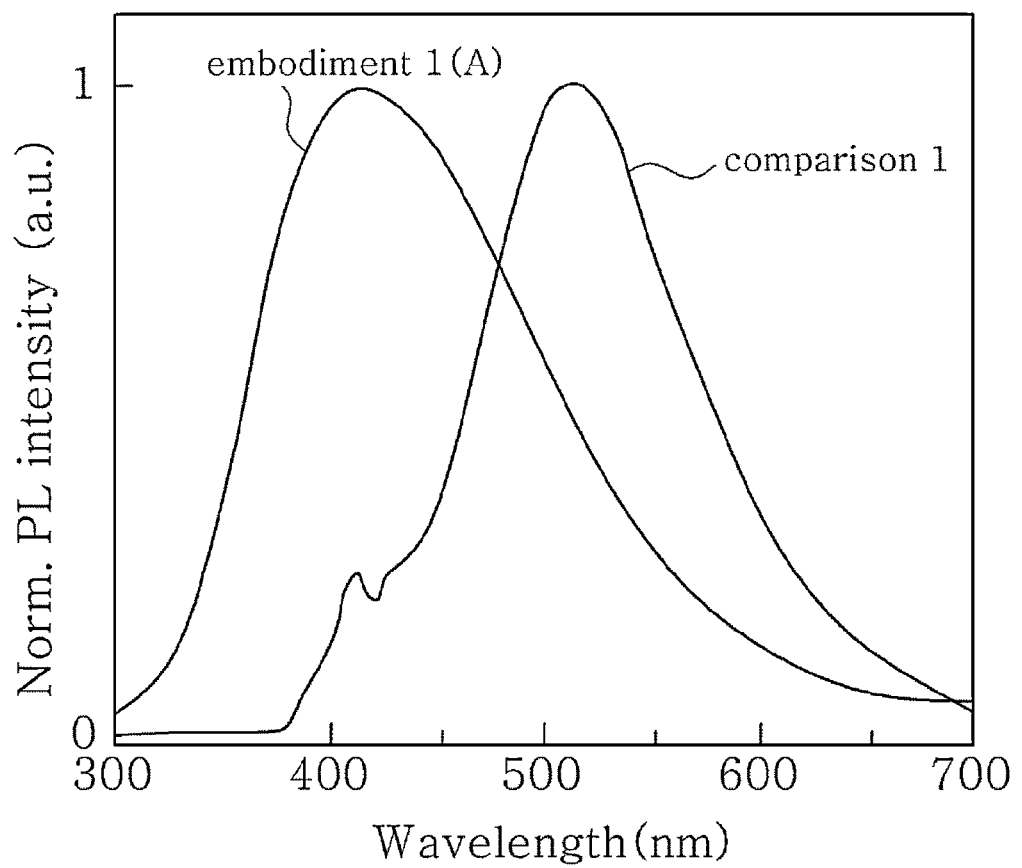
FIG. 9 shows measurement results of emission spectrum of the graphene quantum dots fabricated by an embodiment of the present invention and the graphene quantum dots fabricated by the conventional oxidation/reduction method.

FIG. 9 shows results of the emission spectrum of the graphene quantum dots fabricated by an embodiment of the present invention and the graphene quantum dots fabricated by the conventional oxidation/reduction method.

The blue emission spectrum of the graphene quantum dots fabricated by embodiment 1 implies that the graphene quantum dots fabricated by embodiment 1 was less damaged than the graphene quantum dots fabricated by the comparison 1. In other words, the graphene quantum dots of the comparison 1 show green emission spectrum by a lot of sub-bands due to damages.

The above analysis data prove that it is possible to mass-produce the high quality graphene quantum dots using metallic hydrate salts at low temperature through safe and simple processes.

What is claimed is:

1. A method for fabricating high quality graphene quantum dots, comprising the steps of;
    mixing graphite powders with metallic hydrate salts;
    forming an intercalation compound of graphite wherein metal ions are inserted by heating the mixed solution; and
    removing the metal ions from the intercalation compound of graphite.

2. The method according to claim 1, wherein the metallic hydrate salts include at least one metal selected from the group consisting of Li, Na, K, Ca and Mg.

3. The method according to claim 1, wherein the metal ions of the intercalation compound of graphite is removed by dissolving the intercalated compound in the solvent of one or the mixture selected from the group consisting of alcohol, ketone, ether, water, amide.

4. The method according to claim 1, wherein the metallic hydrate is at least one or the compound selected from the group consisting of sodium acetate trihydrate ($NaC_2H_3O_2 \cdot 3H_2O$), sodium carbonate heptahydrate ($Na_2CO_3 \cdot 7H_2O$), sodium citrate pentahydrate ($Na_3C_6H_5O_7 \cdot 5H_2O$), sodium orthophosphate dodecahydrate ($Na_3PO_4 \cdot 12H_2O$), sodium sulfate heptahydrate ($Na_2SO_4 \cdot 7H_2O$), sodium sulfate decahydrate ($Na_2SO_4 \cdot 10H_2O$), potassium and magnesium sulfate hexahydrate ($K_2SO_4MgCl_2 \cdot 6H_2O$), calcium acetate hexahydrate ($Ca(C_2H_3O_2)_2 \cdot 6H_2O$), calcium carbonate hexahydrate ($CaCO_3 \cdot 6H_2O$), calcium chloride hexahydrate ($CaCl_2 \cdot 6H_2O$), calcium citrate tetrahydrate ($Ca_3[O_2CCH_2C(OH)(CO_2)CH_2CO_2]_2 \cdot 4_2O$), calcium lactate pentahydrate ($Ca(C_5H_3O_3)_2 \cdot 5H_2O$), calcium nitrate trihydrate ($Ca(NO_3)_2 \cdot 3H_2O$), calcium sulfate dehydrate ($CaSO_4 \cdot 2H_2O$), magnesium acetate tetrahydrate ($Mg(C_2H_3O_2)_2 \cdot 4H_2O$), magnesium carbonate pentahydrate ($MgCO_3 \cdot 5H_2O$), magnesium acetate trihydrate ($Mg(C_2H_3O_2)_2 \cdot 3H_2O$), magnesium nitrate hexahydrate ($Mg(NO_3)_2 \cdot 6H_2O$), magnesium orthophosphate octahydrate ($Mg(PO_4)_2 \cdot 8H_2O$), magnesium sulfate heptahydrate ($MgSO_4 \cdot 7H_2O$), magnesium tartrate pentahydrate ($MgC_4H_4O_6 \cdot 5H_2O$) and sodium carbonate decahydrate ($Na_2CO_3 \cdot 10H_2O$).

5. The method according to claim 1, wherein the heating the mixed solution carried out at the temperature range of 70~400° C.

6. The method according to claim 1, further comprising:
    re-dispersing the graphene quantum dots into a solvent for adjusting the size of the graphene quantum dots and controlling the band gap of the graphene quantum dot.

7. The method according to claim 6, wherein the solvent is at least one selected from the group consisting of water, ethanol, methanol, isopropanol, formic amide, dimethyl sulfide, dimethyl formic amide, acetic acid, acetonitrile, methoxyethanol, tetrahydrofuran, benzene, xylene, toluene, and cyclohexane.

8. The method according to claim 1, further comprising:
    mixing the graphite powders with at least one 2 dimensional material selected from the group consisting of $MoS_2$, $WS_2$, $MoSe_2$, $MoTe_2$, $TaSe_2$, $NbSe_2$, $NiTe_2$, BN, and $Bi_2Te_3$.

* * * * *